United States Patent [19]

Noshiro et al.

[11] 3,945,957

[45] Mar. 23, 1976

[54] DRY PLANOGRAPHIC PRINTING INK COMPOSITION

[75] Inventors: Atsumi Noshiro, Tsurumi; Yoshio Inoue, Annaka, both of Japan

[73] Assignee: Dai Nippon Printing Co., Ltd., Tokyo, Japan

[22] Filed: Oct. 18, 1974

[21] Appl. No.: 516,085

[30] Foreign Application Priority Data

Oct. 26, 1973  Japan.............................. 48-119834

[52] U.S. Cl. .................... 260/3.3; 96/33; 101/450; 260/9; 260/16; 260/22 S; 260/22 CQ; 260/33.6 A; 260/33.6 SB
[51] Int. Cl.² . B41M 1/00; C09D 11/10; G03F 7/02
[58] Field of Search ................ 260/22 S, 3.3, 16, 9; 96/33; 101/450

[56] References Cited
UNITED STATES PATENTS

| | | | |
|---|---|---|---|
| 3,015,637 | 1/1962 | Rauner et al. | 260/22 S |
| 3,511,178 | 5/1970 | Curtin | 96/33 |
| 3,632,375 | 1/1972 | Gipe | 96/33 |
| 3,677,178 | 7/1972 | Gipe | 96/33 |
| 3,775,115 | 11/1973 | Sorkin et al. | 96/33 |

FOREIGN PATENTS OR APPLICATIONS

| | | | |
|---|---|---|---|
| 263,604 | 6/1964 | Australia | 96/33 |
| 1,063,558 | 3/1967 | United Kingdom | 96/33 |
| 45-9606 | 7/1970 | Japan | 96/33 |

*Primary Examiner*—Ronald W. Griffin
*Attorney, Agent, or Firm*—Stewart and Kolasch, Ltd.

[57] ABSTRACT

A dry planographic printing ink composition which comprises a vehicle for an ink, a pigment and a solvent, characterized by using as a portion of the vehicle 1 to 40% by weight of silicone modified alkyd resin containing 5 to 50% by weight of organopolysiloxanes represented by the average composition formula:

$$R^1{}_n (R^2O)_m \operatorname{SiO}_{\frac{4-n-m}{2}} \quad (1)$$

wherein $R^1$ stands for a mono-valent unsubstituted hydrocarbon group containing 1 to 4 carbon atoms, $R^2$ stands for a hydrogen atom or mono-valent hydrocarbon group containing 1 to 4 carbon atoms, $n$ is an integer of 1.0 to 2.0, $m$ is an integer of 0.1 to 2.5, but $n + m$ is less than 4. The ink composition is a very favorable dry planographic printing ink composition having a practicable printing adaptability.

18 Claims, No Drawings

DRY PLANOGRAPHIC PRINTING INK COMPOSITION

The present invention relates to a planographic printing ink composition.

The planographic printing which has been mostly used at present has been carried out by means of the following operation by using a plate which has on the surface no clear high and low parts such as in a relief printing plate or intaglio printing plate and consists of an oleophilic image area and a hydrophilic non-image area apparently in the same plane.

That is to say, it is carried out by an operation of dampening water on the above-mentioned hydrophilic non-image area and an ink on the above-mentioned oleophilic image area due to the repulsion of the water and the ink from each other and then transferring the ink deposited on the above-mentioned image area to a matter to be printed to obtain the objective printed matter.

However, in such a planographic printing process, the control of the water, that is the dampening water which can prevent the deposition of the ink onto the non-image area, is very difficult and has caused various problems.

There are great defects that, for example, the transfer of the dampening water onto the ink roller emulsifies the ink on the ink roller and as a result a scumming or tinting is formed, the transfer of the dampening water to the matter to be printed varies the dimension of the matter, and the printed image, particularly in a multicolor printing, is unclear.

Further, in this planographic printing process, in order to obtain a printed matter which has a fixed color tone, it is necessary to maintain the amount of the dampening water and the amount of the ink at a fixed balance. However, it is so difficult to maintain the amounts of both at a fixed balance that there is a defect that the color tone of the printed matter fluctuates.

Therefore, in the planographic printing procedure, a dry planographic printing process has been attempted by using a planographic printing plate requiring no dampening water causing the abovementioned various problems and various dry planographic printing processes have been so far developed and proposed.

For example, as the newest practical process among these dry planographic printing processes, there is known a planographic printing process wherein the printing is carried out by using a planographic printing plate provided with a nonadhesive thin layer of silicone rubber on the non-image area. It is reported that, in such case, the printing can be carried out with a general oil ink without the dampening water. (See for example, U.S. Pat. No. 3,511,178)

However, in this dry planographic printing process, in fact, there is a fatal defect that when the printing is carried out by using a conventional oil ink, a scumming or tinting will be generated due to the printing property. It is undesirable.

In order to improve this process for example, it has been attempted to enlarge the tack value of ink by increasing the coagulating force of the ink, but there is the resultant defect that the piles of dust are so severe that no practicable printing can be carried out.

Further, the printing has been attempted by using various ink compositions but no suitable composition has yet been discovered, and the dry planographic printing process has not yet become practical in fact.

As a result of making various researches on the ink side in the relation of the ink and plate for an ink composition suitable for the above-mentioned dry planographic printing process, the present invention has been completed by discovering a very favorable dry planographic printing ink composition having a practicable printing adaptability.

The object of the present invention is to provide a dry planographic printing ink composition which has no defects as in the prior ink compositions for use in a dry planographic printing process and which contains 1 to 40% by weight of silicone modified alkyd resin in which 5 to 50% by weight of organopolysiloxane is contained therein.

According to the present invention, therefore, there is provided a dry planographic printing ink composition which comprises a vehicle for an ink, a pigment and a solvent, characterized by using as a portion of the vehicle 1 to 40% by weight of silicone modified alkyd resin containing 5 to 50% by weight of organopolysiloxanes represented by the average composition formulas:

$$R^1{}_n (R^2O)_m SiO_{\frac{4-n-m}{2}} \qquad (1)$$

wherein $R^1$ stands for a mono-valent unsubstituted hydrocarbon group containing 1 to 4 carbon atoms, $R^2$ stands for a hydrogen atom or monovalent hydrocarbon group containing 1 to 4 carbon atoms, $n$ is an integer of 1.0 to 2.0, $m$ is an integer of 0.1 to 2.5, but $n + m$ is less than 4.

The present invention shall be explained more particularly in the following.

The silicone modified alkyd resin which may be used in the present invention shall now be explained. For such silicone modified alkyd resin, there can be used various resins which are produced, for example, by the following processes.

In the first one, a vegetable oil and polyhydric alcohol are premixed at a temperature of 200° to 250°C for about one hour, the obtained mixture is then cooled at a temperature of 160° to 200°C, the mixture is mixed with a polybasic acid and organopolysiloxane compound for about one hour and is then heated at a temperature 250° to 300°C to react for several hours.

In the second process, a vegetable oil, polhydric alcohol and polybasic acid are previously reacted together to synthesize an alkyd resin having a high acid value or a high OH value, then the reaction product is added to an organopolysiloxane compound and a reaction is effected at a temperature of 140° to 180°C with dehydration.

The reaction of the organopolysiloxane and alkyd is considered to be a dehydration or dealcoholization reaction between the OH or COOH group in the alkyd and OH or alkoxy group in the silicone.

As the polyhydric alcohols, it is possible to use polyhydric alcohols which are known as a raw material for the synthesis of prior art alkyd resins, for example dihydric alcohols such as ethylene glycol, diethylene glycol, triethylene glycol, propylene glycol, trimethylene glycol and tetramethylene glycol; trihydric alcohols such as glycerine and trimethylol propane;polyhydric alcohols such as diglycerine, triglycerine, pentaerythritol, dipentaerythritol, mannitol and sorbitol.

As the polybasic acids, it is possible to use polybasic acids which are known as a raw material for the synthesis of prior art alkyd resins, for example saturated polybasic acids such as phthalic anhydride and terephthalic, succinic, adipic and sebacic acids; unsaturated polybasic acids such as maleic acid, maleic anhydride and fumaric, itaconic and citraconic acids and polybasic acids which are obtained by the Diels-Alder reaction such as cyclopentadiene-maleic anhydride addition product, terpenemaleic anhydride addition product and rosin-maleic anhydride addition product.

As the vegetable oils, it is possible to use linseed, perilla, tung, sesame, rape seed and soya-bean oils.

As the organopolysiloxane compound, the organopolysiloxane containing a silanol group or alkoxy group in its molecule is effective. The organopolysiloxane containing a silanol group or alkoxy group is represented by the average composition formula:

$$R^1{}_n (R^2O)_m SiO_{\frac{4-n-m}{2}} \quad (1)$$

wherein $R^1$ stands for a mono-valent unsubstituted hydrocarbon group containing 1 to 4 carbon atoms and a phenyl group, $R^2$ stands for a monovalent hydrocarbon group containing 1 to 4 carbon atoms or a hydrogen atom, $n$ is an integer of 1.0 to 2.0, $m$ is an integer of 0.1 to 2.5, but $n + m$ is less than 4.

In the above formula (1), $R^1$ may be a mono-valent hydrocarbon group containing 1 to 4 carbon atoms such as methyl, ethyl, propyl, butyl and vinyl groups or a phenyl radical, $R^2$ may be a hydrogen atom and a mono-valent hydrocarbon group containing 1 to 4 carbon atoms such as methyl, ethyl, propyl, butyl and vinyl groups, $n$ is an integer of 0.1 to 2.0, $m$ is an integer of 0.1 to 2.5, but $n + m$ is less than 4.

As the organopolysiloxane, the following compounds are illustratively mentioned and these compounds may be in the form of a straight chain, branched chain or cyclic structure.

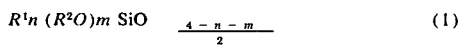

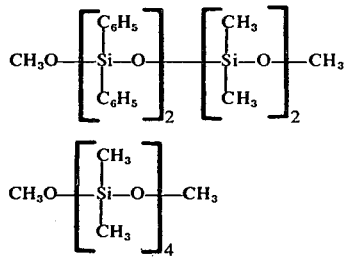

When the modifying content of silicone is less than 3% in the silicone modified alkyd resin, the effect for an adhesion reducing agent will be low. When the modifying content of silicone is 60%, the reaction will be effected only with difficulty. It is desirable that the modifying content of silicone in the silicone modified alkyd resin be preferably 5 to 50%.

The dry planographic printing ink composition containing 1 to 40% of a silicone modified alkyd resin shall now be explained. For such ink composition, there can be used, for example, an ink composition prepared by adding 1 to 40% by weight of the above mentioned silicone modified alkyd resin to a vehicle for an ordinary ink composition, further adding thereto a coloring agent and if necessary any other auxiliary agent and mixing or kneading the mixture together with a solvent or diluent.

As the vehicle for the ink composition, it is possible to use any of the well known vehicles, for example drying oil and synthetic drying oil; natural or modified resins such as rosin, copal, dammer, shellac, hardened rosin and rosin esters; synthetic resins such as phenol resin, rosin modified phenol resin, 100% phenol resin, maleic acid resin, alkyd resin, petroleum resin, vinyl resin, acrylic resin, polyamide resin, epoxy resin, aminoalkyd resin, polyurethane resin and aminoplastic resin; cellulose derivatives such as nitrocellulose and ethyl cellulose; rubber derivatives such as chlorinated rubber, cyclized rubber; and others such as glue, casein, dextrin and zein.

The amount of the vehicle employed for the ink composition is preferably 20 to 80% by weight based upon the total weight of the ink composition.

As the coloring agent in the ink composition, for example, it is possible to use any coloring agents such as inorganic or organic pigments which have been used for prior ink compositions.

As the inorganic and organic pigments, it is possible to use inorganic pigments such as chrome yellow, chrome vermillion, prussian blue, red oxide, cadmium yellow, cadminium red, titanium white, carbon black, alumina white, barium sulfate, calcium carbonate and white lead; and organic pigments such as insoluble azo pigment, azo lake pigment, polyazo pigment, phthalocyanine pigment, authraquinone pigment, thioindigo pigment, perylene pigment, perynone pigment, quinacridone pigment, dioxazine pigment and ilgazine pigment.

The amount of the pigment used is preferably 3 to 40% by weight based upon the total weight of the ink composition.

As the solvent, it is possible to use, hydrocarbon solvents such as solvent naphtha having a high boiling point, spindle oil and machine oil.

As the auxiliary agent in the ink composition, it is possible to use any well known auxiliary agents such as for example wax, grease, plasticizer, stabilizing agent, dryer, assistant dryer, thickener, dispersing agent, filler and others.

The amount of the auxiliary agent used is preferably 5 to 15% by weight based upon the total weight of the ink composition.

As the mixing or kneading methods in the production of the ink composition, for example, it is possible to use conventional methods such as the roll milling, ball milling, attritor and sand milling methods.

When the content of the silicone modified alkyd resin in the ink composition is less than 0.5% by weight, the peelability of an ink from a plate surface in the dry planographic printing is poor. When the content of the silicone modified alkyd resin in the ink composition is more than 50% by weight, there are present disadvantages as in the problems of the roller stability, fluidity and wetting with the pigment in the ink. Therefore, it is desirable that the content of the silicone modified alkyd resin in the printing ink compositioin be preferably 1 to 40%.

As is evident from the above description, the printing ink composition according to the present invention is an ink composition suitable for a dry planographic printing process characterized by containing a silicone modified alkyd resin.

The present invention has been developed by discovering the facts that when the adhesion of an ink to a nonadhesive layer forming the non-image area of a plate in a dry planographic printing process is reduced, a printed matter producing no scumming or tinting will be obtained and on the other hand when the coagulating force of the ink itself is reduced, a scumming or tinting will occur in the non-image area and thereby taking into account the facts that the coagulating force of the ink is not to be particularly limited and the reduction of the adhering energy of the ink is an important point.

As different from any ordinary ink composition, the present invention utilizes an adhering energy reducing agent to prevent the non-image area consisting of a nonadhesive layer from being contaminated by the adhesion of the ink and therefore it is possible to obtain an ink composition wherein particularly the effect of reducing the adhering energy is stabilized by chemically combining a silicone with an ink vehicle.

It has been suggested to reduce the adhering energy of an ink with an ink composition wherein an organopolysiloxane compound chemically uncombined but merely physically mixed with an ink vehicle is added into an ink. However, with such an ink composition, there occur problems such as the poor dispersion of the organopolysiloxane compound in the ink composition, the separation of the organopolysiloxane compound on the ink surface, the increase of the viscosity of the ink, the deterioration of the dispersion of the ink pigment and the slip of the ink on the kneading roll and there are further problems in the increase of the amount of addition, the stability on the machine and the continuous printing adaptability. Thus, it is substantially impossible in practice.

On the other hand, the ink composition of the present invention containing a silicone modified alkyd resin in which an alkyd resin portion and silicone portion are chemically combined together is very stable and has no contamination by the adhesion of the ink to a non-image area consisting of a nonadhesive layer in a dry phanographic printing process because of the adhering energy of the vehicle itself in the ink composition, can be stably used in printing, has no separation of the organopolysiloxane compound on the ink surface, no increase of the ink viscosity, no deterioration of the dispersion of the pigment and no slip of the ink on the kneading roll and is very high in the stability on the roll of the printing machine and in a continuous printing process.

The present invention is illustrated by the following examples in which parts are by weight.

EXAMPLE 1

When the following ink composition A in which a silicone modified alkyd resin was contained and the following ink composition B in which the same amount of organopolysiloxane was contained were used in printing by using a printing plate which had a nonadhesive layer and which was made by the Minnesota Mining and Manufacturing Company without a dampening water in a Heidelberg KOR-D planographic printing machine, the ink A in which the silicone modified alkyd resin was used was favorable in the transfer and produced no scumming or tinting even when more than 30,000 sheets were continuously printed, but on the other hand the ink B in which the organopolysiloxane wax used became poor in the transfer when 5,000 sheets were printed and could not give printed matters on a practicable level.

| Composition of the ink A which was produced by using silicone modified alkyd resin | |
|---|---|
| Carbon black for printing ink | 17.0 parts |
| Phthalocyanine blue | 8.0 " |
| Rosin modified phenol resin varnish A | 60.0 " |
| Wax compound | 7.0 " |
| Cobalt naphthenate (metal concentration: 7.5%) | 1.0 " |
| Manganese naphthenate (metal concentration: 6.5%) | 1.0 " |
| Spindle oil | 6.0 " |
| Total: | 100.0 parts |

The above mentioned mixture was kneaded by using three rolls to obtain an ink for a dry planographic printing of Inkometer tack of 11.0(400 r.p.m., 32°C, 1 minute).

| Composition of the rosin modified phenol resin varnish A | |
|---|---|
| Rosin modified alkyl phenol resin | 40.0 parts |
| Silicone modified alkyd resin A | 10.0 " |
| Dehydrated castor oil | 10.0 " |
| Spindle oil | 38.0 " |
| Aluminum octate | 2.0 " |
| Total | 100.0 parts |

The above-mentioned composition was heated at 180°C for 6 hours to obtain the rosin modified phenol resin varnish A.

Composition for the production of the silicone modified alkyd resin A

Alkyd resin (acid value: 5.7; OH value: 105.2) — 70.0 parts $$\left[\begin{matrix}CH_3\\|\\Si-O\\|\\CH_3\end{matrix}\right]_{15} \left[CH_3-Si-O_{2/3}\right]_6 \left[\begin{matrix}C_6H_5\\|\\Si-O\\|\\C_6H_5\end{matrix}\right]_1 \left[C_6H_5-Si-O_{2/3}\right]_4 \quad 30.0\ ''$$

Content of OH radical: 4.2% by weight

Total: 100.0 parts

The mixture having the above composition was reacted at 150°C for 5 hours to obtain a yellow transparent viscous silicone modified alkyd resin.

| Composition of the ink B which was produced by adding silicone oil | |
| --- | --- |
| Carbon black for printing ink | 17.0 parts |
| Phthalocyanine Blue | 8.0 " |
| Rosin modified phenol resin varnish B | 60.0 " |
| Wax compound | 7.0 " |
| Cobalt naphthenate (metal concentration: 7.5%) | 1.0 " |
| Manganese naphthenate (metal concentration: 6.5%) | 1.0 " |
| Organopolysiloxane compound used in the ink | 1.8 " |
| Spindle oil | 4.2 " |
| Total: | 100.0 parts |

The above-mentioned mixture was kneaded by using three rolls to obtain an ink of Inkometer tack of 11.0 (400 r.p.m., 32°C, 1 minute).

| Composition of the rosin modified phenol resin gel varnish B | |
| --- | --- |
| Rosin modified alkyl phenol resin | 40.0 parts |
| Alkyd resin | 10.0 " |
| Dehydrated castor oil | 10.0 " |
| Spindle oil | 38.0 " |
| Aluminum octate | 2.0 " |
| Total: | 100.0 parts |

Even when other pigments, for example disazo Yellow Carmine 6B, Quinacridone Red, and carbon black were used in the ink A, it was possible to produce an ink and the printing adaptability was favorable as a result.

EXAMPLE 2

70.0 parts of linseed oil were mixed with 10.0 parts of pentaerythritol and the mixture was heated and agitated at 220°C for one hour. Then the mixture was cooled to 200°C and the following compounds were added thereto:

| | |
| --- | --- |
| Isophthalic acid | 10.0 parts |
| Tetrahydrophthalic acid | 10.0 " |
| $CH_3O\left[\begin{matrix}C_6H_5\\Si-O\\C_6H_5\end{matrix}\right]_2 \left[\begin{matrix}CH_3\\Si-O\\CH_3\end{matrix}\right]_2 CH_3$ | 50.0 " |
| Calcium naphthenate | 0.5 " |

After one hour of mixing, the temperature of the mixture was raised to 280°C to effect a reaction for 5 hours. As a result a yellow transparent viscous silicone modified alkyd resin was obtained.

Using the above silicone modified alkyd resin, an ink was prepared according to the composition of the ink A of example 1. The prepared ink was used in a printing plate which had a nonadhesive layer and which was made by the Minnesota Mining and Manufacturing Company without a dampening water in a Heidelberg KOR-D planographic printing machine. The ink was favorable in the transfer and produced no scumming or tinting even when more than 30,000 sheets were continuously printed.

The production of the ink was possible even when any kind of pigment was used, and the printing adaptability was favorable as a result.

EXAMPLE 3

When the following ink C in which a silicone modified alkyd resin of Inkometer tack of 9.0 (400 r.p.m., 32°C, 1 minute) was used in the case where the coagulating force of the ink was reduced and the following ink D in which silicone oil was used to print in a practical manner, the ink C was able to continuously print 30,000 sheets and in that case no scumming or tinting occurred, and on the other hand the ink D was able to continuously print only 2,000 sheets and in that case the ink was piled on the roll and a poor transfer occurred and printed matters on a practicable level could not be obtained.

| Composition of the ink C which was produced by using silicone modified alkyd resin | |
| --- | --- |
| Carbon black for printing ink | 17.0 parts |
| Phthalocyanine Blue | 8.0 " |
| Rosin modified phenol resin gel varnish C | 57.0 " |
| Wax compound | 7.0 " |
| Cobalt naphthenate (metal concentration: 7.5%) | 1.0 " |
| Manganese naphthenate (metal concentration: 6.5%) | 1.0 " |
| Spindle oil | 9.0 " |
| Total: | 100.0 parts |

The above-mentioned mixture was kneaded by using three rolls to obtain an ink for a dry planographic printing of Inkometer tack of 9.0 (400 r.p.m., 32°C, 1 minute).

| Composition of rosin modified resin gel varnish C | |
| --- | --- |
| Rosin modified alkyl phenol resin | 40.0 parts |
| Silicone modified alkyd resin B | 20.0 " |
| Spindle oil | 38.0 " |
| Aluminum octate | 2.0 " |
| Total: | 100.0 parts |

The above-mentioned mixture was heated and agitated at 180°C for 5 hours to obtain rosin modified phenol resin gel varnish C.

| Composition for the production of silicone modified alkyd resin B | |
| --- | --- |
| Alkyd resin (acid value: 50.2, OH value: 85.3) | 50.0 parts |
| $CH_3O\left[\begin{matrix}CH_3\\Si-O\\CH_3\end{matrix}\right]_4 CH_3$ | 50.0 " |
| Paratoluenesulfonic acid | 0.5 " |
| Total: | 100.5 parts |

The above-mentioned mixture was reacted together at 150°C for 4 hours to obtain a yellow transparent viscous silicone modified alkyd resin.

| Composition of the ink D which was produced by adding silicone oil | |
| --- | --- |
| Carbon black for printing ink | 17.0 parts |
| Phthalocyanine Blue | 8.0 " |
| Rosin modified phenol resin gel varnish B which was used in example 1 | 57.0 " |
| Wax compound | 7.0 " |
| Cobalt naphthenate (metal concentration: 7.5%) | 10.0 " |
| Manganese naphthenate (metal concentration: 6.5%) | 10.0 " |
| Organopolysiloxane which was used in the ink C | 5.7 " |
| Spindle oil | 3.3 " |

| Composition of the ink D which was produced by adding silicone oil | |
|---|---|
| | Total: 100.0 parts |

The above-mentioned mixture was kneaded by using three rolls to obtain an ink D of Inkometer tack of 9.0 (400 r.p.m., 32°C, 1 minute),

EXAMPLES 4 to 7

Inks were respectively prepared by the same manner as in Example 1 using such materials as described in the following Table 1. The respectively prepared inks were used in the printing the same as in Example 1 by using a printing plate which had a non-adhesive and which was made by the Minnesota Minning and Manufacturing Company without a dampening water in a Heidelberg KOR-D planographic printing machine. As a result, the transfer was favorable and no scumming or tinting was produced when more than 30,000 sheets were continuously printed.

EXAMPLES 8 to 10

Inks were respectively prepared by the same manner as in Example 2 using such materials as described in the following Table 2. The respectively prepared inks were used in the printing the same as in Example 2 by using a printing plate which had a nonadhesive and which was made by the Minnesota Minning and Manufacturing Company without a dampening water in a Heidelberg KOR-D planographic printing machine. As a result, the transfer was favorable and no scumming or tinting was produced when more than 30,000 sheets were continuously printed.

Table 2

| Example No. | Vehicle | Silicone modified alkyd resin | | Pigment | Auxiliary agent | Solvent |
|---|---|---|---|---|---|---|
| | | Organo-polysiloxane | Alkyd resin | | | |
| 8 | Alkyd resin: 10.5 parts | Same as in Example 1 | Ethylene glycol: 1 part | Carbon black | Same as in Example 1 | Solvent naptha |
| | Rosin ester: 20 parts | 5 parts | Maleic anhydride: 0.5 parts Tung oil: 13.5 parts | 20 parts | 9 parts | 30.5 parts |
| 9 | Maleic acid resin: 30 parts | Same as in Example 2 | Glycerine: 1.2 parts Fumaric acid: 0.8 parts Castor oil: 6 parts Sorbitol: 0.5 parts | Benzidine yellow | Same as in Example 1 | Machine oil |
| | Linseed oil: 24 parts | 3 parts | | 10 parts | 9 parts | 17 parts |
| 10 | Petroleum resin: 50 parts | Same as in Example 3 | Terephthalic acid: 0.5 parts | Cadmium red | Same as in Example 1 | Spindle oil |
| | | 1 part | Perrila oil: 4 parts | 10 parts | 9 parts | 25.7 parts |

What we claim is:

1. A dry planographic printing ink composition which comprises a vehicle for an ink, a pigment and a solvent, characterized by using as a portion of the vehicle 1 to 40% by weight of a silicone modified alkyd resin containing 5 to 50% by weight of an organopolysiloxane represented by the average composition formula:

$$R^1{}_n (R^2O)_m SiO_{\frac{4-n-m}{2}}$$

wherein $R^1$ is a monovalent unsubstituted hydrocarbon group having 1 to 4 carbon atoms, $R^2$ is a hydrogen atom or a monovalent hydrocarbon group having 1 to 4 carbon atoms, $n$ is an integer of 1.0 to 2.0, and $m$ is an Table 1

| Example No. | Vehicle | Silicone modified alkyd resin | | Pigment | Auxiliary agent | Solvent |
|---|---|---|---|---|---|---|
| | | Organo-polysiloxane | Alkyd resin | | | |
| 4 | Petroleum resin: 31 parts Alkyd resin: 7 parts | Same as in Example 1 0.5 parts | Alkyd resin (acid value: 8, OH value: 95) 2.5 parts | Prussian blue 20 parts | Same as in Example 1 9 parts | Spindle oil 30 parts |
| 5 | Maleic acid resin: 20 parts | Same as in Example 3 18 parts | Alkyd resin (acid value: 40.5, OH value: 153) 20 parts | Carbon black 18 parts | Same as in Example 1 9 parts | Spindle oil 15 parts |
| 6 | Rosin ester: 12 parts Rosin modified phenol resin: 18 parts Tung oil: 17 parts | Same as in Example 1 5 parts | Alkyd resin (acid value: 68.5, OH value: 40.2) 5 parts | Phthalocyanine green 14 parts | Same as in Example 1 9 parts | Alkylbenzene 20 parts |
| 7 | Maleic acid resin: 5 parts Polyurethane: 5 parts Linseed oil: 34 parts | Same as in Example 1 7 parts | Alkyd resin (acid value: 5.7, OH value: 105.2) 7 parts | Dioxazine violet 13 parts | Same as in Example 1 9 parts | Solvent naphtha 20 parts | integer of 0.1 to 2.5, $n+m$ being less than 4, said vehicle being selected from the group consisting of drying oil, synthetic drying oil, rosin, copal, dammer, shellac, hardened rosin, rosin esters, phenolic resins, rosin-modified phenolic resins, maleic acid resins, alkyd resins, petroleum resins, vinyl resins, polyamide resins, epoxy resins, aminoalkyd resins, polyurethane resins, aminoplast resins, nitrocellulose, ethyl cellulose, chlorinated rubber, cyclized rubber, glue, casein, dextrin and zein.

2. A dry planographic printing ink composition as claimed in claim 1 wherein the composition consists of 20 to 80% by weight of the vehicle for an ink, 1 to 40% by weight of the silicone modified alkyd resin and 3 to 40% by weight of the pigment based upon the total weight of the composition and the solvent.

3. A dry planographic printing ink composition as claimed in claim 1 wherein in said organopolysiloxane, $R^1$ is selected from the group consisting of methyl, ethyl, butyl, vinyl and phenyl and $R^2$ is selected from the group consisting of hydrogen, methyl, ethyl, propyl, butyl and vinyl.

4. A dry planographic printing ink composition as claimed in claim 1 wherein the pigment is an inorganic pigment selected from the group consisting of chrome yellow, chrome vermillion, prussian blue, red oxide, cadmium yellow, cadmium red, titanium white, carbon black, alumina white, barium sulfate, calcium carbonate and white lead.

5. A dry planographic printing ink composition as claimed in claim 1 wherein the pigment is an organic pigment selected from the group consisting of an insoluble azo pigment, azo lake pigment, polyazo pigment, phthalocyanine pigment, anthraquinone pigment, thioindigo pigment, perylene pigment, perynone pigment, quinacridone pigment, dioxazine pigment and ilgazine pigment.

6. A dry planographic printing ink composition as claimed in claim 1 wherein the solvent is a hydrocarbon.

7. A dry planographic printing ink composition as claimed in claim 6 wherein said solvent is selected from the group consisting of solvent naphtha having a high boiling point, alkylbenzene, spindle oil and machine oil.

8. A dry planographic printing ink composition as claimed in claim 1 wherein the composition contains the vehicle for an ink, the silicone modified alkyd resin, the pigment, the solvent and an auxiliary agent selected from the group consisting of wax, grease, plasticizer, stabilizing agent, dryer, assistant dryer, thickener, dispersing agent and filler.

9. A dry planographic printing ink composition as claimed in claim 8 wherein the auxiliary agent is used in a quantity of 5 to 15% by weight based upon the total weight of the composition.

10. A dry planographic printing ink composition as claimed in claim 1, wherein the vinyl resin is an acrylic resin.

11. A dry planographic printing ink composition as claimed in claim 1 wherein said silicone modified alkyd resin is a product which is obtained by premixing a vegetable oil with a polyhydric alcohol at a temperature of 200° to 250°C. for about one hour, cooling the obtained mixture to a temperature of 160° to 200°C., mixing the mixture with a polybasic acid and an organopolysiloxane for about one hour and then heating the resultant mixture to a temperature of 250° to 300°C. for several hours.

12. A dry planographic printing ink composition as claimed in claim 11 wherein the vegetable oil is linseed, perilla, tung, sesame, rape seed or soya-bean oil.

13. A dry planographic printing ink composition as claimed in claim 11 wherein the polyhydric alcohol is selected from the group consisting of ethylene glycol, diethylene glycol, triethylene glycol, propylene glycol, trimethylene glycol, tetramethylene glycol, glycerine, trimethylol propane, diglycerine, triglycerine, pentaerythritol, dipentaerythritol, mannitol and sorbitol.

14. A dry planographic printing ink composition as claimed in claim 11 wherein the polybasic acid is selected from the group consisting of phthalic anhydride, terephthalic acid, succinic acid, adipic acid, sebacic acid, maleic acid, maleic anhydride, fumaric acid, itaconic acid, citraconic acid, cyclopentadienemaleic anhydride addition product, terpene-maleic anhydride addition product and rosin-maleic anhydride addition product.

15. A dry planographic printing ink composition as claimed in claim 1 wherein said silicone modified alkyd resin is a product which is obtained by previously reacting together a vegetable oil, a polyhydric alcohol and a polybasic acid to synthesize an alkyd resin having a high acid value or a high OH value, adding said alkyd resin to an organopolysiloxane and effecting a reaction at a temperature of 140° to 180°C. with dehydration.

16. A dry planographic printing ink composition as claimed in claim 15 wherein the vegetable oil is linseed, perilla, tung, sesame, rape seed or soya-bean oil.

17. A dry planographic printing ink composition as claimed in claim 15 wherein the polyhydric alcohol is selected from the group consisting of ethylene glycol, diethylene glycol, triethylene glycol, propylene glycol, trimethylene glycol, tetramethylene glycol, glycerine, trimethylol propane, diglycerine, triglycerine, pentaerythritol, dipentaerythritol, mannitol and sorbitol.

18. A dry planographic printing ink composition as claimed in claim 15 wherein the polybasic acid is selected from the group consisting of phthalic anhydride, terephthalic acid, succinic acid, adipic acid, sebacic acid, maleic acid, maleic anhydride, fumaric acid, itaconic acid, citraconic acid, cyclopentadienemaleic anhydride addition product, terpene-maleic anhydride addition product and rosin-maleic anhydride addition product.

* * * * *